Nov. 26, 1929.  A. G. MARTIN  1,737,317
NUT LOCK
Filed Aug. 24, 1927.
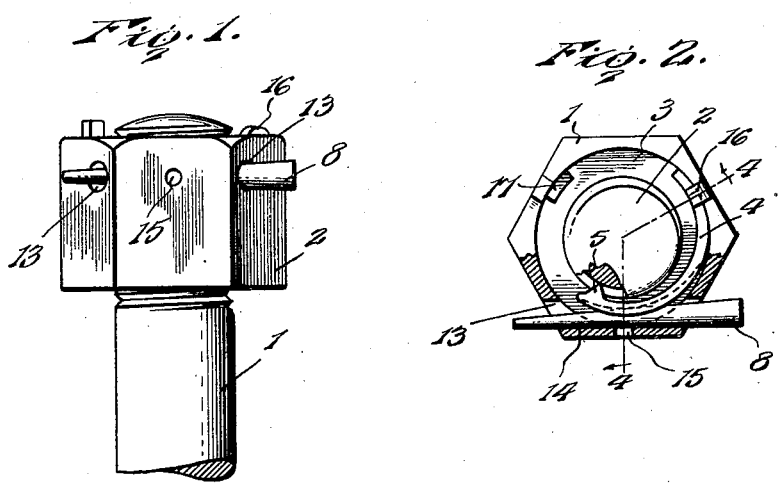
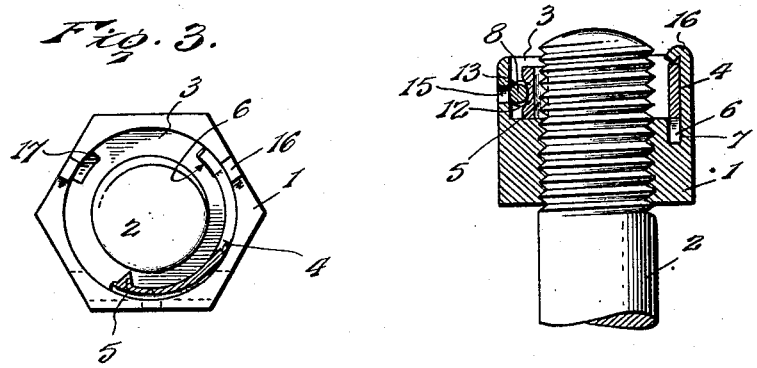
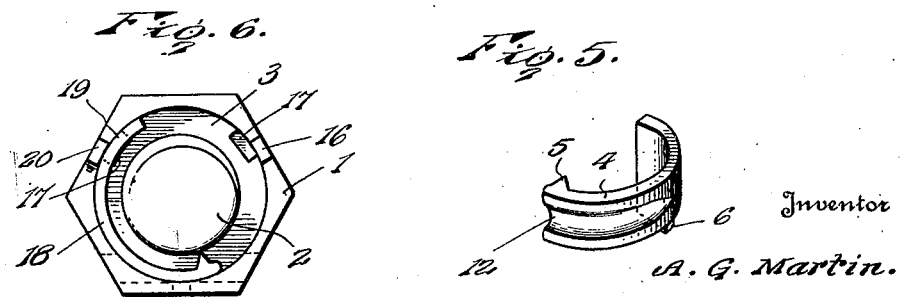
Inventor
A. G. Martin.
By Lacey & Lacey, Attorneys Patented Nov. 26, 1929

1,737,317

UNITED STATES PATENT OFFICE

ABRAHAM G. MARTIN, OF JEANNETTE, PENNSYLVANIA

NUT LOCK

Application filed August 24, 1927. Serial No. 215,192.

This invention relates to improvements in nut locks especially intended for well diggers, track bolts, and in any instance where a locked nut is required.

One object of the invention among others is to provide a nut locking device having a lug formed on the nut for maintaining a thread engaging spring dog in position within said nut.

Another object of the invention is to provide a nut locking device including a spring dog having a groove formed therein to receive the locking pin for the dog.

A further object of the invention is to provide a device having a recess formed in the nut to accommodate the dog, and a socket in the bottom of said recess to receive a lug formed on the spring dog, thus sustaining said dog in operative position.

In the accompanying drawings:

Figure 1 is a side elevation of the device showing a nut locked in position on a bolt.

Figure 2 is a top plan view partly broken away and shown in section.

Figure 3 is a top plan view of the device showing the locking pin removed.

Figure 4 is a sectional view of the device on the line 4—4 of Figure 2, looking in the direction indicated by the arrows.

Figure 5 is a perspective view of the spring dog showing the spur and the mounting lug formed on the dog.

Figure 6 is a plan view showing a slight modification of the invention.

Referring more particularly to the drawings, the numeral 1 indicates a bolt, and screwed on said bolt is a nut 2. Formed in one end of said nut in concentric relation to the axis thereof is a recess 3, seen more clearly in Figure 4, and removably disposed in said recess is an arcuate spring dog 4 which is preferably formed of hardened steel. Formed integrally with and at one end of the dog 4 is an inwardly projecting V-shaped spur 5 having a sharp cutting edge thereon which extends the width of said dog. Formed at the other end of the dog and at its lower edge is a downwardly projecting rectangular lug 6, and formed in the bottom wall of the recess 3 flush with the side wall thereof is a socket 7 which freely receives said lug. Thus the dog is anchored against endwise movement and is supported within the recess of the nut so that the spur 5 thereof is disposed to engage the bolt.

Formed in the dog 4 and disposed between the upper and lower edges of said dog is a longitudinally extending trough-shaped groove 12, seen more clearly in Figure 5, traversing the greater portion of the length of the dog and which is gradually deepened toward the free end of the dog.

Formed on a level with the groove 12 of the dog 4 in the wall of the recess 3 of the nut, are aligned chordally disposed openings 13, and extending between these openings is a groove 14 in the inner face of the wall of said recess. Disposed intermediately between these openings and intersecting the groove 14 is a radial opening 15.

Removably driven through the openings 13 is a tapered pin 8, which is received in the mating grooves 12 and 14, wedging the cutting edge of the spur 5 into the threads of the bolt 2, thus locking the nut against retrograde movement. Thus, the pin will coact with the wall of the groove 12 for locking the free end of the dog against upward movement.

Integrally formed on the upper edge of the nut 2 is a normally upstanding rectangular lug 16 which is bent laterally inward to overlie the upper edge of the dog 4 and bind said dog in position, thus maintaining said dog in operative relation to the other parts of the device and preventing accidental dislodgment of the dog.

In use, the nut is screwed on the bolt to the desired adjustment when the spring dog is disposed in position. The pin 8 is then inserted into the opening 15 and against the spring dog when the pin is hammered, thus driving the spur 5 of the dog into the threads of the bolt, forming a seat therein. The pin 8 is then withdrawn from the opening 15 and driven into the aligned openings 13 to engage in the mating grooves 12 and 14 for locking the spur 5 in the seat previously formed in the bolt. The lug 16 on the nut is then bent over and inward for binding the dog in working position.

In the modification shown in Figure 6 of the drawing, I employ a nut similar to that shown in Figure 3. Formed in the bottom wall of the recess of the nut in addition to the socket 7, is a like rectangular socket 17, and mounted in said recess is a spring dog 18 similar to the spring dog 4 except that it extends in the opposite direction. Formed on the bottom edge of the dog and spaced from the butt end of said dog, is a depending lug 19 which freely fits into the socket 17. Formed on the nut, in addition to the lug 7, is a like lug 20 which may be bent over for securing the dog in position.

As will be perceived, the main features of difference as between the arrangement shown in Figure 6 and that shown in the other figures of the drawing, lies in the fact that the lug 19 of the dog 18 is spaced from the butt end of the dog while the dog is curved to extend at the side of the bolt opposite the side thereof confronted by the dog 4. Thus, retrograde movement of the nut will exert a pulling stress on the dog 4 and a pushing stress on the dog 18. The nut is preferably formed to accommodate either dog selectively so that either one dog or the other may be used at will. Except in the particulars noted, the device of Figure 6 is identical with the preferred construction shown in the other figures of the drawing and operates in a like manner. If desired, the key 8 may be split longitudinally.

Having thus described the invention, what I claim is:

A nut locking device including a threaded bore and an annular nut having a recess in its outer end communicating with the bore, the nut being provided with a socket leading from the recess, a dog disposed in the recess and having one end portion formed with a lug for engagement in the socket to hold the dog against endwise movement, means adjustably carried by the nut to coact with the dog for binding the dog in engagement with a bolt, and a lug extending from the outer end of the nut and bent inwardly into overlying engagement with the dog to hold the lug thereof in the socket.

In testimony whereof I affix my signature.

ABRAHAM G. MARTIN. [L. S.]